(12) United States Patent
Chopra et al.

(10) Patent No.: US 9,552,259 B1
(45) Date of Patent: Jan. 24, 2017

(54) DYNAMIC PROVISIONING OF SNAPSHOTS

(71) Applicant: EMC Corporation, Hopkinton, MA (US)

(72) Inventors: Shelesh Chopra, Karnataka (IN); Vladimir Mandic, San Jose, CA (US); John Rokicki, Rutland, MA (US); Joseph Murphy, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 200 days.

(21) Appl. No.: 14/292,290

(22) Filed: May 30, 2014

(51) Int. Cl.
*G06F 17/00* (2006.01)
*G06F 11/14* (2006.01)

(52) U.S. Cl.
CPC .................. *G06F 11/1461* (2013.01)

(58) Field of Classification Search
None
See application file for complete search history.

(56) References Cited

U.S. PATENT DOCUMENTS

| | | | | |
|---|---|---|---|---|
| 7,389,394 B1* | 6/2008 | Karr | ...................... | G06F 3/0613 711/161 |
| 8,930,497 B1* | 1/2015 | Holmes | .................... | G06F 15/16 709/217 |
| 2010/0058011 A1* | 3/2010 | Satoyama | ........... | G06F 11/1458 711/162 |
| 2010/0257403 A1* | 10/2010 | Virk | .................... | G06F 11/1453 714/15 |
| 2011/0283075 A1* | 11/2011 | Jess | ........................ | G06F 3/061 711/162 |
| 2012/0166723 A1* | 6/2012 | Araki | .................. | G06F 12/0871 711/113 |
| 2014/0101108 A1* | 4/2014 | Stewart | ............... | G06F 11/1458 707/649 |
| 2014/0130055 A1* | 5/2014 | Guha | .................... | G06F 3/0604 718/104 |
| 2015/0046230 A1* | 2/2015 | Laksman | .......... | G06Q 10/06393 705/7.39 |

* cited by examiner

*Primary Examiner* — Hung Le
(74) *Attorney, Agent, or Firm* — Blakely, Sokoloff, Taylor & Zafman LLP

(57) ABSTRACT

A method and system are provided for dynamic provisioning of snapshots in a data backup system with a software defined storage (SDS). The method implemented by the backup system receives a snapshot provisioning request including a user selection of snapshot objectives by a dynamic snapshot module, converts a file system reference mapping to a logical unit number (LUN) of the SDS, consolidates the snapshot provisioning request to the mapping and snapshot frequency, and passes the consolidated snapshot provisioning request to the SDS to provision snapshots.

22 Claims, 2 Drawing Sheets

DYNAMIC PROVISIONING OF SNAPSHOTS

FIELD OF INVENTION

Embodiments of the present invention relate generally to data backup and recovery. More particularly, embodiments of the invention relate to storing data in a backup system as a set of snapshots that are dynamically provisioned.

BACKGROUND

In modern computer systems, a file system stores and organizes computer files to enable a program to efficiently locate and access requested files. File systems can utilize a storage device such as a hard disk drive to provide local access to data or to utilize a network to provide access to data stored on a remote file server over the network. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. A local client data backup application prepares and sends data from the local file system to a backup system. The backup system stores the data received from the local client application to be utilized in the event of a corruption or failure at the computing device executing the local client data backup application.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
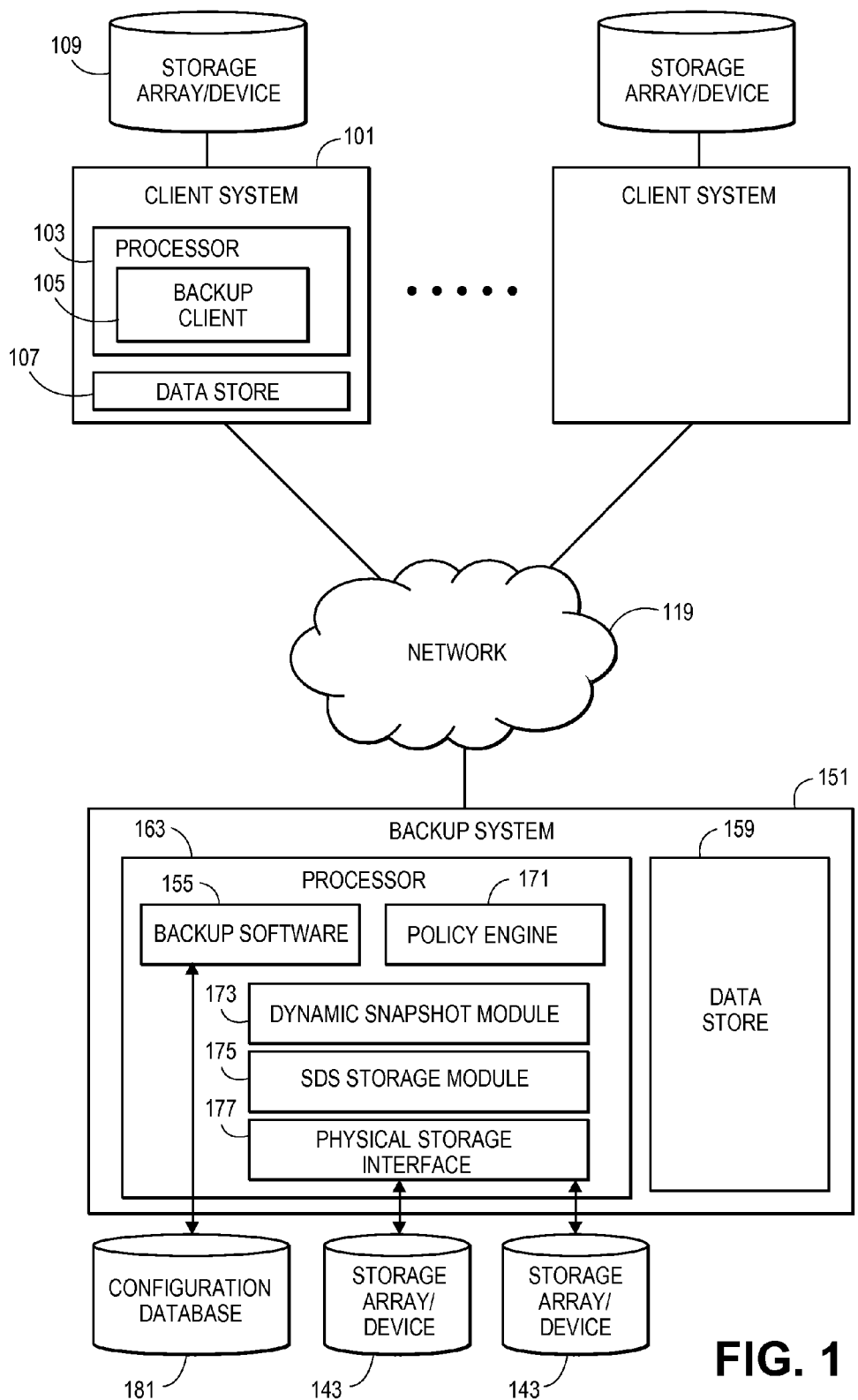
FIG. 1 is a block diagram of one embodiment of a backup data storage and recovery system.

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

As discussed herein above, data backup and data backup systems are designed to store a copy of a set of data storage systems in case of disaster recovery (DR) or similar scenarios. DR is a process of preparing for recovery or continued operation of technology infrastructure critical to an organization after a disaster that renders a computer inoperable or corrupts the data on the physical disk. One of the critical aspects of DR planning is timely recovery of data and processes following the incident. Organizations develop recovery strategies to ensure that the system downtime is minimal at best, within acceptable limits/threshold and predictable. For reducing outage time, the system should be recovered quickly and effectively following disruption. Currently, time to recover depends on the type of data and the size of critical data.

In backup systems, the backed up data is stored as a set of snapshots of the data storage system that are captured over time. This is in contrast to 'standard' backup processes that makes a duplicate and compresses it into another format on the backup system. Snapshot based backup can provide a backup with less downtime or disruption to the data storage system and that can provide a fast data recovery process. There are several types of storage snapshot systems including copy-on-write and split-mirror snapshot systems. The capacity to generate these snapshots is included in many data backup clients.

A copy-on-write snapshot creation process generates a snapshot of changes to stored data every time new data is stored or existing data is modified on the data storage system. Thus, the backup data is always up to date enabling immediate recovery of data in its most recent form in case of a failure. However, all previous snapshots from the point of failure to the last full snapshot image of the data storage system must be available for recovery.

A split-mirror snapshot process references all the data on a set of mirrored drives. Each time the process is executed, a snapshot is created of the entire volume, rather than just the changes to the volume. Having complete snapshots simplifies the process of recovering, duplicating, or archiving all the data on a drive. However, this is a slower process, and it requires more storage space for each snapshot and changes made since the last snapshot are lost.

In some embodiments, the snapshots are generated by leveraging the snapshot capabilities of either data storage system hardware/array based capabilities (e.g., a Symmetrix or similar backup software programs) or related software based capabilities (e.g., capabilities such as virtualization, volume management or similar data storage system related software). The Symmetrix system is a system of EMC Corporation of Hopkinton, Mass. A system for snapshot backups can have the following major components:

(1) a source/production host: this is the host data storage system where the production data is hosted (i.e., the data to be backed up);

(2) a source logical unit number (LUN): the source host has the production data provisioned to the source LUN (i.e., the production data is stored in a source LUN), e.g., a production host can have source LUNs coming from Symmetrix or similar data storage systems;

(3) a mount host/data mover/proxy: these are different names for the same component, this is the host system where the backup snapshots are mounted;

(4) target LUN: the mount host has the storage of the backup snapshots provisioned to the target LUN, e.g., the mount host has target LUNs coming from Symmetrix or similar data storage systems; and (5) backup server: the backup server includes a policy engine (amongst other components), which manages the backup process. Though the snapshots are handled at the data storage array or software level (dependent on the production host), the metadata information related to the snapshot backup process goes to a backup server catalog managed by the backup server; and (6) zoning: a logical grouping of data storage arrays using a set of switches, both source and mount hosts are zoned properly to associated data storage arrays using respective sets of switches.

Disadvantages of the prior art include that existing backup software requires users to specify and lock the relationship between client (i.e., production hosts) and mount hosts. The production hosts need to specify which of the available mount hosts are to be provisioned for the storage of backup data for that production host. However, as can be understood from the definitions above, mount hosts are not a very specialized role in the backup system, any mount host that is properly zoned to the storage array into which the backup data is to be stored or has exposure to see the target LUN can act as the mount host for a given production host. Thus, the embodiments provide advantages over the prior art by providing a method and system for avoiding a static binding of mount host, data mover or proxy with a production host. Instead, the provisioning process has been made dynamic in nature.

Also, the existing backup software requires that a storage and backup administrator provision the backup snapshots for the specified source host. There is a significant change in landscape with the introduction of Software Defined Storage (e.g., the ViPR system by EMC). This change provides a great leverage point for the storage and backup administrators to provide an easy yet very integrated solution of backup software, storage and snapshot storage arrays without exposing the complexity of the provisioning. The backend is very agnostic to the end user and what the end user generally is concerned with is that the source LUNS are protected via some reliable and fast mechanism.

The embodiments of the invention leverage the innovations in parallel domains like software defined storage (SDS) and create the snapshots on the fly using the abstracted services that sit between the backup software and the data storage arrays. Please note the model in itself is scalable to the same length as the underlying application programming interface (API) and service would be. Moreover the model can also be integrated with any similar API such as the EMC ViPR. ViPR of EMC is provided by way of example, however others skilled in the art would understand that the principles and structures described herein are applicable to other virtualized SDS environments.

In the embodiments described herein, the user selects the policy, protection, recovery time objective (RTO), and/or recovery point objective (RPO) and this input is translated into the required snapshot policy to effect the input policies and objectives and is dynamically configured on the fly in the backup system. A recovery point objective (RPO) indicates a frequency of time over which recovery is required such as a weekly, daily or hourly backup. A recovery time objective (RTO) indicates a period of time in which a recovery of the backup data is desired and/or how far back in time data is required to be recoverable.

The further advantages of the embodiments, include that the embodiments overcome all the limitations that are set forth above and provides the following discrete advantages: (1) dynamic provisioning of the snapshots; (2) dynamic discovery of the data storage arrays mapped to the required mount hosts; (3) a simplified administrative approach and intuitive modeling of the backup system; (4) improved overall customer experience due to reduction in overhead and user errors; and (5) simplification of configuration processes.

FIG. 1 is a block diagram of one embodiment of a backup data storage and recovery system. The embodiments provide an integration point so that the snapshots (and type of snapshots) can be provisioned dynamically based on the request of backup client software 105 or similar software as well as the policies being configured at the backup system 151 policy engine 171. The embodiments provide a dynamic snapshot module 173, which can be implemented as an application programming interface (API) (e.g., as a SNAP API) that would interact between backup software 151 and an SDS storage module 175 (e.g., the ViPR API by EMC). The dynamic snapshot module is scalable to get plugged in with other APIs (not shown) that would provide an SDS storage module 175 (e.g., ViPR) type interface and capabilities. The dynamic snapshot module 173 decouples provisioning from the business logic. Business logic remains with the backup software whereas the SDS (work-horse) can be offloaded to a virtualized implementation (e.g., ViPR or equivalent system). This creates a modular solution which can be easily pluggable or compatible with other backup and virtualization components that are available in the present or in the future.

All the requirements for establishing a backup process for a particular source host are input into the backup client 105 using simple queries and terminology like—"What is your RTO and RPO." Based on what a user selects; the type of snapshots or the number of snapshots to be taken and the prescribed timelines can be determined. This requirement from the user is then translated into the actual snapshot terminology and is given the backup software to the SDS storage module 175 which in-turn addresses the required needs like provisioning of snapshots based on the underlying hardware; service level agreements (SLA) and supported snap technologies. Once the required provisioning has been determined, a client resource is updated and corresponding policy (snapshot policies) are created.

Figure 2:
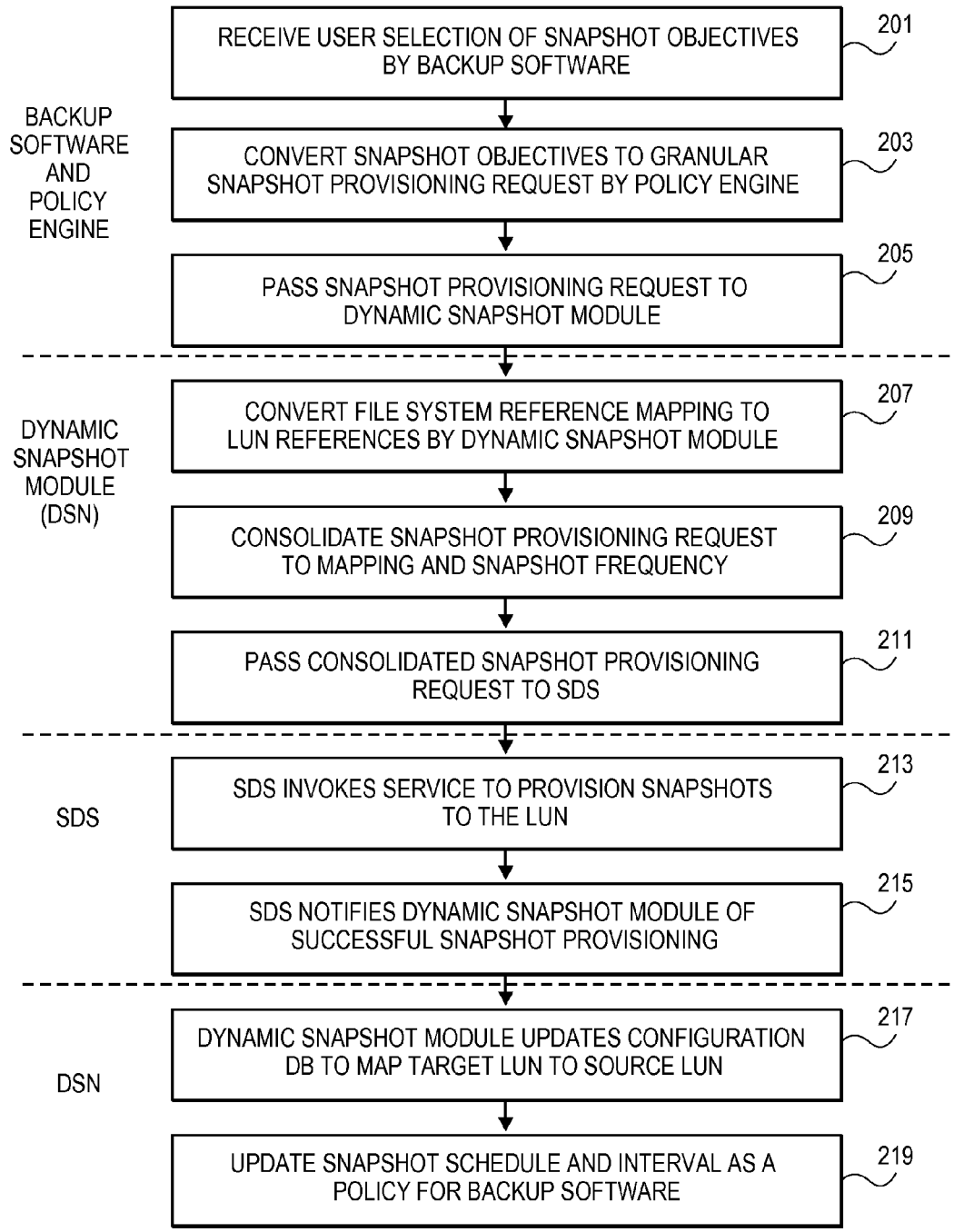
FIG. 2 is a flowchart of one embodiment of dynamic snapshot provisioning process.

With these general concepts established, an example abstracted implementation is described with relation to FIG. 1 and an example process with relation to FIG. 2. One skilled in the art would understand that the example system and process are abstractions for sake of clarity and as not to obscure the relevant portions of the embodiments.

In one embodiment, a backup and recovery system 151 is in communication with a set of computing devices 101 over a network 119. A 'set,' a used herein refers to any positive whole number of items including one item. The backup and recovery system 151 can store a set of backup volumes that are block transfer replicas of physical volumes of the computing devices 101 at the time of the last backup.

The backup and recovery system 151 can be a single server machine or can be a set of separate server machines. The backup and recovery system 151 can include a processor 163 and a data store 159 amongst other standard components of a server machine. The data store 159 can be any type of dynamic or static data storage system utilized by the processor 163 and the backup system 151 to store working data, program data and similar data. The backup system can also include network interfaces (not shown) for enabling communication over a network 119. The processor 163 can be a single processor or a set of processors in a single housing or spread across a set of servers. These processors 163 can execute backup software 155, policy engine 171, dynamic snapshot module 173, SDS storage module 175 and physical storage interface 177. The backup software 155 drives the collection of the snapshot data at defined intervals governed by the policy engine 171 that is stored in the physical data storage arrays 143A, B, which are organized as a set of target LUNs that are managed by the SDS storage module 175 via the respective physical storage interfaces 177.

The physical data storage arrays/devices 143A, B can be composed of any number, type and/or combination of persistent storage devices such as optical, magnetic or solid state drives. The physical data storage arrays/devices 143A, B can from separate vendors and have differing storage formats, storage protocols and physical interfaces 177. The software defined storage (SDS) module 175 can discover the capabilities of each of the data storage arrays 103A, B by querying the respective physical storage interface 177. The SDS module 175 provides an abstracted and/or virtualized interface and management functions for handling the backup of data from the client systems 101 as a set of snapshots or in similar formats enabling the storage of data across the available data storage arrays 143A, B without the backup software 155 having to have knowledge of the varying protocols and formats of the underlying physical storage interfaces 177 and physical data storage arrays 143A, B.

The dynamic snapshot module 173 interfaces with the backup software 155 and physical storage interface 177 to map source hosts to mount hosts and target LUNs dynamically based on user input specifying policies, protection, RTO, RPO and similar preferences. The mapping is determined by the dynamic snapshot module 173 without requiring the user to make a fixed binding between the source host, mount host and target LUNs. The user preferences and the mapping information can be stored in a configuration database 181. The further operation of these components is described herein below with regard to FIG. 2.

The client systems 101 can be any type or number of computing devices including desktop devices, servers, mobile devices, or similar devices with fixed storage and network capabilities. The client systems 101 can be stand-alone devices or a set of devices linked in a storage area network (SAN) or similar configuration. The client systems 101 can include a processor 103, data store 107, storage array or device 109, network interface (not shown), and similar components. The processor 103 can be a set of processors to execute programs and applications within the client system 101 including local backup client software 105 that can provide a configuration interface and/or manage the local collection of snapshots and data backup operations. The data store 107 can be utilized for short term data storage for the programs and applications of the computing system 101. Similarly, the storage array or device 109 can maintain a set of physical or logical volumes that include a set of file systems maintained by an operating system of the client system 101.

The physical or logical volumes in the storage array 109 can have any file system structure, content or organization. The dynamic snapshot provisioning process described herein is compatible with any file system or content. The storage array 109 can have any number of physical devices with any amount of storage. This storage can be divided into any number of physical or logical volumes. Each of these physical or logical volumes can be backed up via snapshots at the backup system 151 by the backup software 155. In the case of a failure or corruption, the physical or logical volumes can be replaced with the corresponding backup volumes to return the client system 101 to operation in a timely and predictable manner.

The network 119 can provide access between the client systems 101 and the backup system 151. The client system 101 can be connected to any number of networks 119 and any type of networks including local area networks (e.g., a SAN), wide area networks, such as the Internet, and similar networks. The client systems 101 can be connected through either wired or wireless communication mediums.

FIG. 2 is a flowchart of one embodiment of dynamic snapshot provisioning process. In one embodiment, the process is initiated via the backup software and policy engine. Specifically, the user can interface with a backup client or directly with backup software at the backup system. In either case, the backup software receives the user selections, directly or indirectly, including a set of snapshot and backup related objectives including policies, protection, RTO, RPO and similar backup and snapshot related objectives for the user (Block 201). The backup software conveys the received objectives to the policy engine which converts the snapshot objectives to granular provisioning request semantics (Block 203). The conversion is deterministic and maps the objectives to a set of snapshot provisioning request parameters specific to the dynamic snapshot module and the SDN module. Any mapping or conversion can be supported and the mapping and conversion can be configurable by the user or SDN administrator. The snapshot objectives do include references to the file system of source host, which can form a part of the granular parameters of the snapshot provisioning request. The backup software then passes the snapshot provisioning request to the dynamic snapshot module (Block 205).

The dynamic provisioning module converts the file system references of the snapshot provisioning request by mapping them to a set of LUN references in the SDN (Block 207). The target LUN can be selected by the dynamic provisioning module and tracked or coordinated with the SDN. With the source host file system references mapped to the target LUN(s), the snapshot provisioning request can be consolidated to the mapping and snapshot frequency parameters (Block 209). With this consolidation other data and parameters provided but not required to configure the operations of the SDS can be discarded and the consolidated snapshot provisioning request can be passed on to the SDS module (Block 211).

The SDS receives the provisioning request and invokes the services of the SDS to provision snapshots to the target LUN (Block 213). The SDS and its services can determine a target LUN within the available storage arrays. The SDS then notifies the dynamic snapshot module of the successful snapshot provisioning (Block 215). This notification can include the identification of the selected Target LUN managed by the SDS module. Thus, the mapping between a source host and a target host is completed without requiring a user to determine and bind the two hosts. The SDS can also reconfigure this mapping as needed transparent to the source host.

The dynamic snapshot module updates the configuration database to record the mapping of the target LUN to the source LUN (Block 217). This can be updated when or if the SDS alters the target LUN. The mapping can be used for the storage of the snapshot data going forward. Using this updated mapping information, the dynamic snapshot module can update the schedule and intervals for the snapshot backup as a policy for the backup software such that the schedule and intervals can be confirmed and the mapping of the source LUN and target LUN can be included in the determination (Block 219).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A method for dynamic provisioning of snapshots in a data backup system with a software defined storage (SDS), the method comprising:

receiving a snapshot provisioning request including a user selection of snapshot objectives by a dynamic snapshot module;

dynamically converting a file system reference in the snapshot provisioning request by mapping the file system reference to a logical unit number (LUN) of the SDS;

dynamically consolidating the snapshot provisioning request to the mapping and snapshot frequency;

discarding data and parameters not required to configure the operations of the SDS; and passing the consolidated snapshot provisioning request to the SDS to provision snapshots.

2. The method for dynamic provisioning of snapshots of claim 1, further comprising:

updating a configuration database to map a target LUN to a source LUN.

3. The method for dynamic provisioning of snapshots of claim 1, further comprising:

updating a snapshot schedule and interval as a policy for backup software.

4. The method for dynamic provisioning of snapshots of claim 1, further comprising:

receiving notification of successful snapshot provisioning.

5. The method for dynamic provisioning of snapshots of claim 1, wherein the user selection of snapshot objectives includes a recovery point objective (RPO).

6. The method for dynamic provisioning of snapshots of claim 1, wherein the user selection of snapshot objectives includes a recovery time objective (RTO).

7. The method for dynamic provisioning of snapshots of claim 1, further comprising:

invoking SDS services to provision snapshots for the LUN specified in the consolidated snapshot provisioning.

8. The method for dynamic provisioning of snapshots of claim 1, further comprising:

converting user selected snapshot objectives to the snapshot provisioning request by a policy engine.

9. The method for dynamic provisioning of snapshots of claim 1, wherein the LUN of a data storage array managed by the SDS is discovered by the SDS.

10. A non-transitory computer-readable medium having stored therein a set of instructions, which when executed by a computer processor, cause a computer to perform a set of operations for dynamic provisioning of snapshots in a data backup system with a software defined storage (SDS), the operations comprising:

receiving a snapshot provisioning request including a user selection of snapshot objectives by a dynamic snapshot module;

dynamically converting a file system reference in the snapshot provisioning request by mapping the file system reference to a logical unit number (LUN) of the SDS;

dynamically consolidating the snapshot provisioning request to the mapping and snapshot frequency;

discarding data and parameters not required to configure the operations of the SDS; and passing the consolidated snapshot provisioning request to the SDS to provision snapshots.

11. The non-transitory computer-readable medium of claim 10, having further instructions stored therein, which when executed cause the computer to perform further operations comprising:

updating a configuration database to map target a LUN to a source LUN.

12. The non-transitory computer-readable medium of claim 10, having further instructions stored therein, which when executed cause the computer to perform further operations comprising:
    updating a snapshot schedule and interval as a policy for backup software.

13. The non-transitory computer-readable medium of claim 10, having further instructions stored therein, which when executed cause the computer to perform further operations comprising:
    receiving notification of successful snapshot provisioning.

14. The non-transitory computer-readable medium of claim 10, wherein the user selection of snapshot objectives includes a recovery point objective (RPO).

15. The non-transitory computer-readable medium of claim 10, wherein the user selection of snapshot objectives includes a recovery time objective (RTO).

16. The non-transitory computer-readable medium of claim 10, having further instructions stored therein, which when executed cause the computer to perform further operations comprising:
    invoking SDS services to provision snapshots for the LUN specified in the consolidated snapshot provisioning.

17. The non-transitory computer-readable medium of claim 10, having further instructions stored therein, which when executed cause the computer to perform further operations comprising:
    converting user selected snapshot objectives to the snapshot provisioning request by a policy engine.

18. The non-transitory computer-readable medium of claim 10, wherein the LUN of a data storage array managed by the SDS is discovered by the SDS.

19. A system comprising a memory and at least one hardware processor, the memory programmed with executable instructions that, when executed, perform operations that dynamically provision of snapshots in a data backup system with a software defined storage (SDS), the operations comprising:
    receiving a snapshot provisioning request including a user selection of snapshot objectives by a dynamic snapshot module;
    dynamically converting a file system reference in the snapshot provisioning request by mapping the file system reference to a logical unit number (LUN) of the SDS;
    dynamically consolidating the snapshot provisioning request to the mapping and snapshot frequency;
    discarding data and parameters not required to configure the operations of the SDS; and
    passing the consolidated snapshot provisioning request to the SDS to provision snapshots.

20. The system for dynamic provisioning of snapshots of claim 19, the operations further comprising:
    updating a configuration database to map a target LUN to a source LUN.

21. The system for dynamic provisioning of snapshots of claim 19, the operations further comprising:
    updating a snapshot schedule and interval as a policy for backup software.

22. The system for dynamic provisioning of snapshots of claim 19, the operations further comprising:
    receiving notification of successful snapshot provisioning.

* * * * *